(12) United States Patent
Ashok et al.

(10) Patent No.: US 12,229,269 B2
(45) Date of Patent: Feb. 18, 2025

(54) TECHNIQUES FOR RESTRICTED DEPLOYMENT OF TARGETED PROCESSOR FIRMWARE UPDATES

(71) Applicant: Intel Corporation, Santa Clara, CA (US)

(72) Inventors: Chinmay Ashok, Beaverton, OR (US); Vasudevan Srinivasan, Portland, OR (US); Atanas K. Iwanow, Hillsboro, OR (US); Martin G. Dixon, Portland, OR (US); Scott J. Cape, Portland, OR (US); Scott Bobholz, Bolton, MA (US); David T. Mayo, Boxborough, MA (US); Vinila Rose, Cupertino, CA (US); Lorie Wigle, Hillsboro, OR (US); Jason Kennedy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 914 days.

(21) Appl. No.: 17/127,122

(22) Filed: Dec. 18, 2020

(65) Prior Publication Data
US 2021/0103662 A1    Apr. 8, 2021

(51) Int. Cl.
*G06F 21/57* (2013.01)
*G06F 21/10* (2013.01)
*G06F 21/44* (2013.01)

(52) U.S. Cl.
CPC ......... *G06F 21/572* (2013.01); *G06F 21/105* (2013.01); *G06F 21/44* (2013.01); *G06F 21/1078* (2023.08); *G06F 2221/033* (2013.01)

(58) Field of Classification Search
CPC ..... G06F 8/60; G06F 8/71; G06F 8/61; G06F 8/65–656; G06F 21/53; G06F 21/57;
(Continued)

(56) References Cited

U.S. PATENT DOCUMENTS 6,516,346 B1 *  2/2003  Asco ................... G06F 8/65
                                                    709/221
7,069,452 B1 *  6/2006  Hind .................. G06F 21/572
                                                    713/1
(Continued)

OTHER PUBLICATIONS

Phoronix, "AMD Plumbing Linux Support For Reading The CPU's Protected Processor Identification Number (PPIN)", Written by Michael Larabel, Mar. 19, 2020, "https://www.phoronix.com/news/AMD-PPIN-Processor-ID-Linux" (Year: 2020).*

*Primary Examiner* — Jerry B Dennison
(74) *Attorney, Agent, or Firm* — Compass IP Law PC

(57) ABSTRACT

Methods and apparatus for restricted deployment of targeted processor firmware updates. During a patch enabling per-work flow, service entitlement license information comprising one of more service entitlements is generated and provisioned on one or more computing platforms. A restricted deployment microcode (uCode) update release (aka uCode patch) targeted for platforms having CPUs and/or XPUs with certain part identifier is sent to the one or more platforms. Run-time software and/or firmware on the platforms are executed to access the provisioned service entitlement license information, which is used to authentic and verify the restricted deployment uCode update release using a service entitlement having a part identifier associated with the platform's CPU. In one solution, authentication is performed using a hash-matching scheme and verification is used to verify the platform is properly licensed to load uCode included in the restricted deployment microcode (uCode) update release into the CPU.

15 Claims, 11 Drawing Sheets

(58) Field of Classification Search
CPC ...... G06F 21/572; G06F 21/44; G06F 21/105; H04L 67/34
See application file for complete search history.

(56) References Cited

U.S. PATENT DOCUMENTS

| | | | |
|---|---|---|---|
| 9,881,348 B2* | 1/2018 | Hughes | G06Q 50/184 |
| 2007/0088939 A1* | 4/2007 | Baumberger | G06F 9/24 |
| | | | 712/248 |
| 2013/0013905 A1* | 1/2013 | Held | G06F 21/572 |
| | | | 713/2 |
| 2013/0151861 A1* | 6/2013 | Gan | G06F 21/10 |
| | | | 713/189 |
| 2013/0185563 A1* | 7/2013 | Djabarov | H04L 67/34 |
| | | | 717/173 |
| 2014/0047506 A1* | 2/2014 | Yabe | G06F 21/105 |
| | | | 726/3 |
| 2017/0090909 A1* | 3/2017 | Guo | G06F 8/66 |
| 2019/0042230 A1* | 2/2019 | Dewan | G06F 21/57 |
| 2020/0192659 A1* | 6/2020 | Kumar | G06F 21/572 |
| 2021/0026966 A1* | 1/2021 | Ghetie | H04L 9/0643 |
| 2021/0103662 A1* | 4/2021 | Ashok | G06F 8/654 |
| 2023/0125218 A1* | 4/2023 | Hiratsuka | G06F 21/105 |
| | | | 705/59 |

* cited by examiner

TECHNIQUES FOR RESTRICTED DEPLOYMENT OF TARGETED PROCESSOR FIRMWARE UPDATES

BACKGROUND INFORMATION

Microcode (uCode) updates, also commonly referred to a uCode patches, are used to deliver critical fixes for CPU (Central Processing Unit) products in the field such as processors implemented in data centers and/or other cloud environments. These updates apply at the granularity of the CPU with a unique patch associated with each unique CPUID (CPU identifier)+Family Model Stepping (FMS) (CPUID.FMS) within a product family. Occasionally, there is a need to restrict the deployment of an update to a subset of parts with the same CPUID.FMS within a product family. This may be for, but not restricted to, any of the following scenarios:
- to test a specific fix across a limited subset of parts;
- to deploy a new feature in a restricted manner and gather customer feedback via a Software Development Vehicle (SDV);
- to debug a failure only occurring on a subset of Intel CPUs in the install base under the same CPUID.FMS;
- to restrict the application of a patch to certain systems that adhere to critical use case parameters to avoid exposure on untested use-cases/systems/customers; and
- to restrict the application of a patch to a subset of customers utilizing parts with a given CPUID.FMS.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
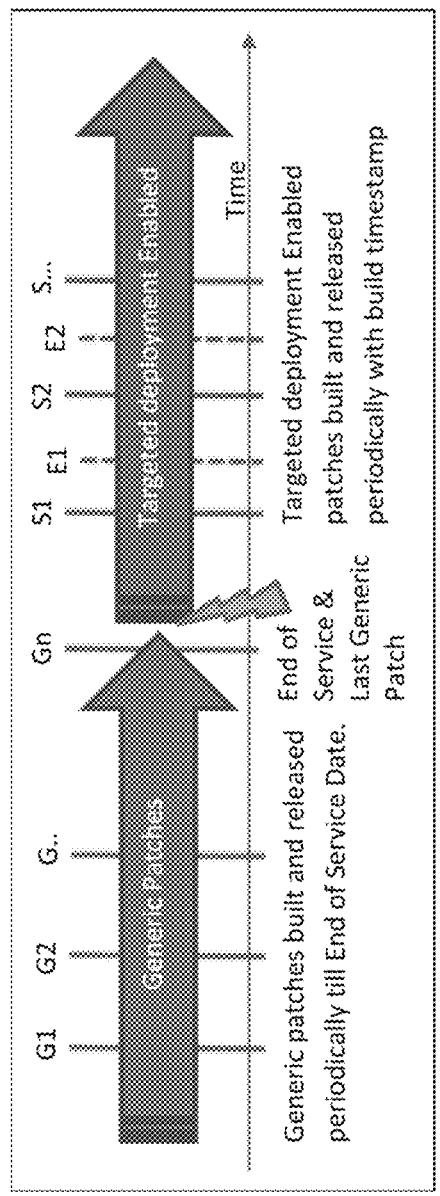
FIG. 1 is a diagram illustrating a CPU patch timeline under which generic patches are followed by targeted deployment enabled patches.

Embodiments of methods and apparatus for restricted deployment of targeted processor firmware updates are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, solutions for restricted deployment of targeted processor firmware (e.g., CPU microcode) updates are provided. A core aspect of the solutions employs three components detailed below that when deployed together enable a customer to negotiate a targeted support license with a CPU vendor for a subset of parts in their fleet and at runtime request targeted support on a part in the field and for the CPU vendor to authenticate a support update and verify the license to allow restricted deployment of the targeted support update. The components include,
- A. A standard (aka, base) microcode update release with capabilities to allow future targeted releases. For some CPUs, the standard/base release functionality is built into the microcode in silicon, so a separate microcode update release is not needed.
- B. A new microcode loader accessible memory region dedicated for the purposes of storing targeted support license information (e.g. defining a new region within a Firmware Interface Table (FIT) that the BIOS/OS can access during boot to read and pass authentication and license verification information to the microcode loader as part of the load).

C. A special support microcode update release only for parts identified as requiring targeted support.

Microcode Patch Types

To support restricted deployment of microcode updates, a CPU vendor may have two types of patch releases: (A) a standard microcode patch; and (B) a targeted microcode patch.

In one embodiment, the standard microcode patch includes enhanced capabilities to allow future targeted deployments. This includes the ability to query a part-specific identifier such as the Protected Processor Inventory Number (PPIN) Model Specific Register (MSR) that can be read and provided to the CPU vendor to create a part-specific entitlement license; and a new MSR (or similar) enabled ability to request the load of a restricted deployment enabled microcode update with the part-specific entitlement license. In one embodiment, the new MSR mechanism is enabled to authenticate the entitlement license to ensure the current part is covered under the license, and detect targeted entitlement expiration based on an encrypted payload in the entitlement license. If a customer uses this generic patch on an unentitled CPU/Platform, the patch will still load fine and no issues will be seen.

The targeted microcode patch will be built and released to be installed only on a specific subset of vendor CPUs with the CPUID.FMS this patch was built for. In one embodiment, a targeted microcode path contains a build timestamp in the form of the date of patch build that can be compared with an entitlement license payload to determine if the current part is covered under a license that extends beyond the date this targeted deployment enabled microcode patch was built. In one embodiment, for a customer to use this restricted deployment microcode patch on a given platform, they must first enable the platform for this restricted deployment capability by provisioning the platform with a vendor provided Service entitlement. This will ensure the restricted deployment patch can load successfully on such platforms.

Pictorially, the patch release types, and an exemplary timeline are as shown in FIG. 1. At a high level, targeted deployment enabled patches (S1, S2, . . . ) have the "Build Timestamp" embedded for each patch. Targeted deployment entitlements (E1, E2, . . . ) have the "Targeted deployment Expiry Date" embedded for each entitlement.

A particular targeted deployment enabled patch will load successfully on a processor if and only if (a) a targeted deployment entitlement (aka service entitlement) is present and authenticated successfully and (b) the targeted deployment expiry date extracted from the entitlement is a date later than the targeted deployment enabled patch's build timestamp. For example, if a system has an entitlement E1 with a targeted deployment expiry date that is later than S1's build time stamp, but earlier than S2's build time stamp, then only S1 will load on that system successfully. S2 will fail to load since S2 was built and released after the E1's expiry date. If S2 must be loaded, a customer could get a new entitlement E2 from the CPU vendor to successfully load S2.

In one embodiment, the last generic patch Gn includes the targeted capabilities for a standard microcode patch presented above built in.

Targeted Deployment Provisioning

The provisioning of targeted deployment is achieved using an entitlement that is signed by the CPU vendor and contains an encrypted targeted deployment expiry date. This entitlement is provided to the targeted deployment enabled microcode patch to authenticate and load. In one embodiment, there are two options for the provisioning: Patch load time provisioning, and Flash-based provisioning.

Under Patch load time provisioning, the targeted deployment entitlement is supplied to the patch loader at the time of the patch load using the MSR (or similar) mechanism enabled by the last base patch release (hereafter referred to as Gn) or build into the silicon microcode for some recent and future CPUs. This can be in the form of a memory pointer for the entitlement based on the part identifier such as the PPIN or the entitlement itself after having been looked up from a central lookup-table based on the part identifier such as the PPIN, for the current CPU for which a patch is loaded. In one embodiment, the actual entitlements could be stored within a BIOS if BIOS is doing the patch load or it could be stored in a file system if an operating system (OS) software component does the patch load without any changes to system BIOS or firmware.

Under Flash-based provisioning, to enable targeted deployments and to be able to use targeted deployment enabled microcode patches, the platform is first provisioned. Since some embodiments are targeted to work with older generation CPUs/platforms as well as newer CPUs/platforms, in some embodiments the Firmware Interface Table (FIT) region of the SPI Flash is used to store the targeted deployment entitlements. In one embodiment, a FIT type of 0x04 or similar is defined to indicate/identify a targeted deployment entitlement region where all the targeted deployment entitlements will be stored.

Figure 2:
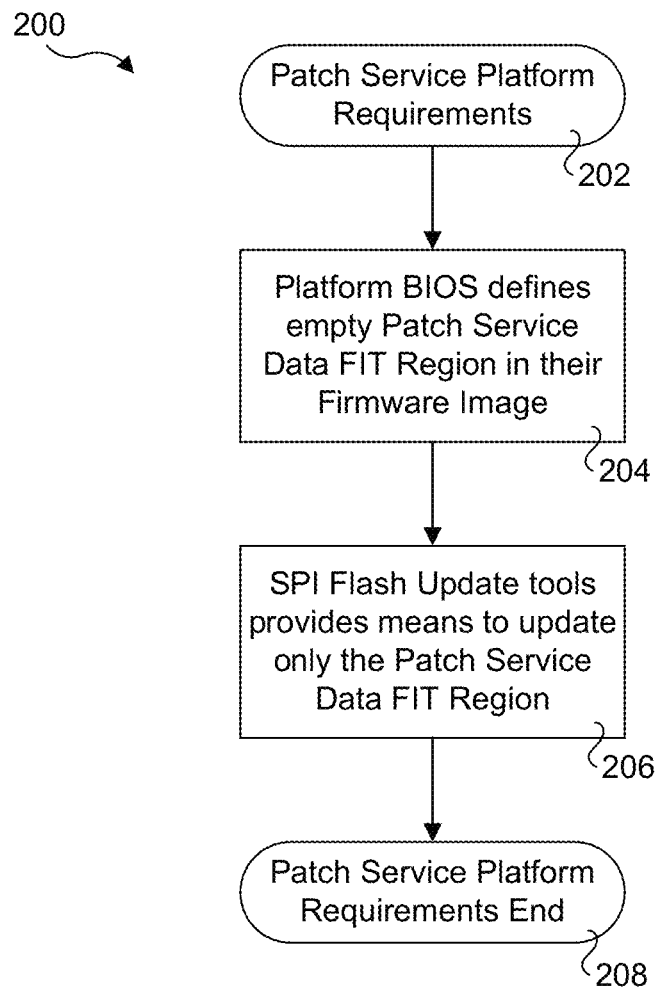
FIG. 2 is a flowchart illustrating a process for defining patch service platform requirements, according to one embodiment.

FIG. 2 shows a flowchart 200 illustrating a process for defining patch service platform requirements, according to one embodiment. The process begins in a start block 202 and ends with an end block 208. In a block 204 the platform BIOS defines an empty patch service data FIT region in its firmware image. In a block 206, the SPI (Serial Peripheral Interface) flash update tools provide a means to update only the patch service data in the FIT region.

In one non-limiting embodiment, the structure and layout of the service entitlement FIT region includes the information shown in TABLE 1, which is also referred to as a license table.

TABLE 1

| Start Offset | Size in Bytes | Description |
| --- | --- | --- |
| 0 | 4 | Entitlement FIT Region Identifier |
| 4 | 4 | Number of Entitlements |
| 8 | 512 | Entitlement 1 |
| 8 + 512 | 512 | Entitlement 2 |
| 8 + 2 * 512 | 512 | Entitlement n |
| 8 + n* 512 | 512 | Last Entitlement |

In one embodiment, the structure and layout of the entitlement content includes:

1. Entitlement Unique Identifier
2. Entitlement Generation Date
3. Processor PPIN
4. Encrypted Processor Targeted Deployment Expiry Date
5. Hash-based message authentication code (HMAC)

Both the Entitlement Unique Identifier and the Entitlement Generation Date are used for record keeping purposes, and are optional. The Processor PPIN is used to associate this entitlement to a specific CPU model version or part.

In one embodiment, the Encrypted Processor Targeted Deployment Expiry Date comprises encoded and then encrypted information that has the same format of the "Patch Build Date" embedded in the targeted deployment enabled uCode patch at the time of patch build. Generally, any form of date stamp may be used, such as nanoseconds since Jan. 1, 1970 or a timestamp generated with a standard time API. Generally, encryption is optional but is recommended to protect the license payload from unauthorized load. In one embodiment, a unique key used for encryption is contained in Gn as part of the targeted capabilities allowing the load of targeted deployment enabled uCode patches.

Figure 7:
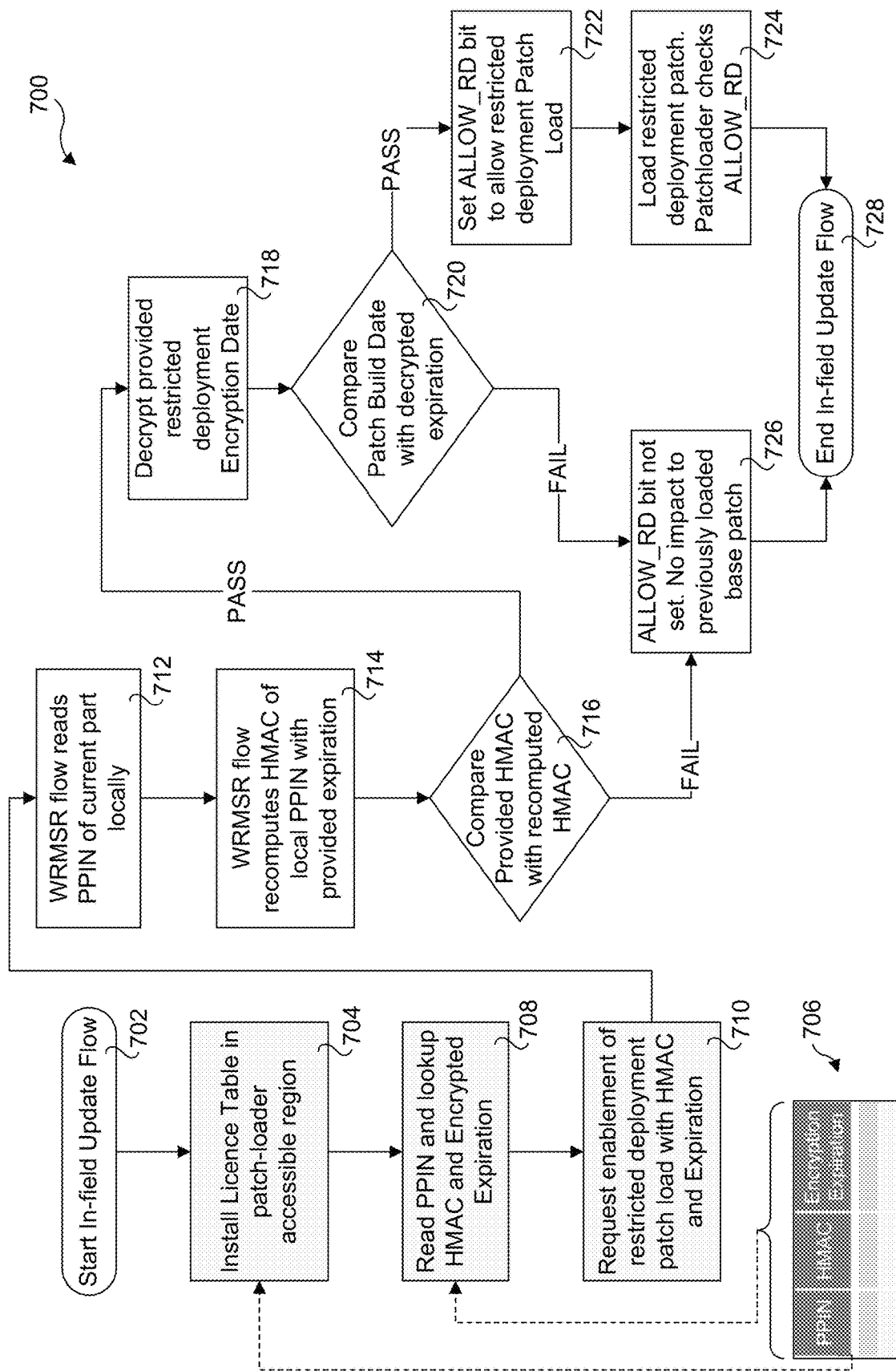
FIG. 7 is a flowchart illustrating operations and logic performed during an in-field update flow, according to one embodiment.
Figure 8:
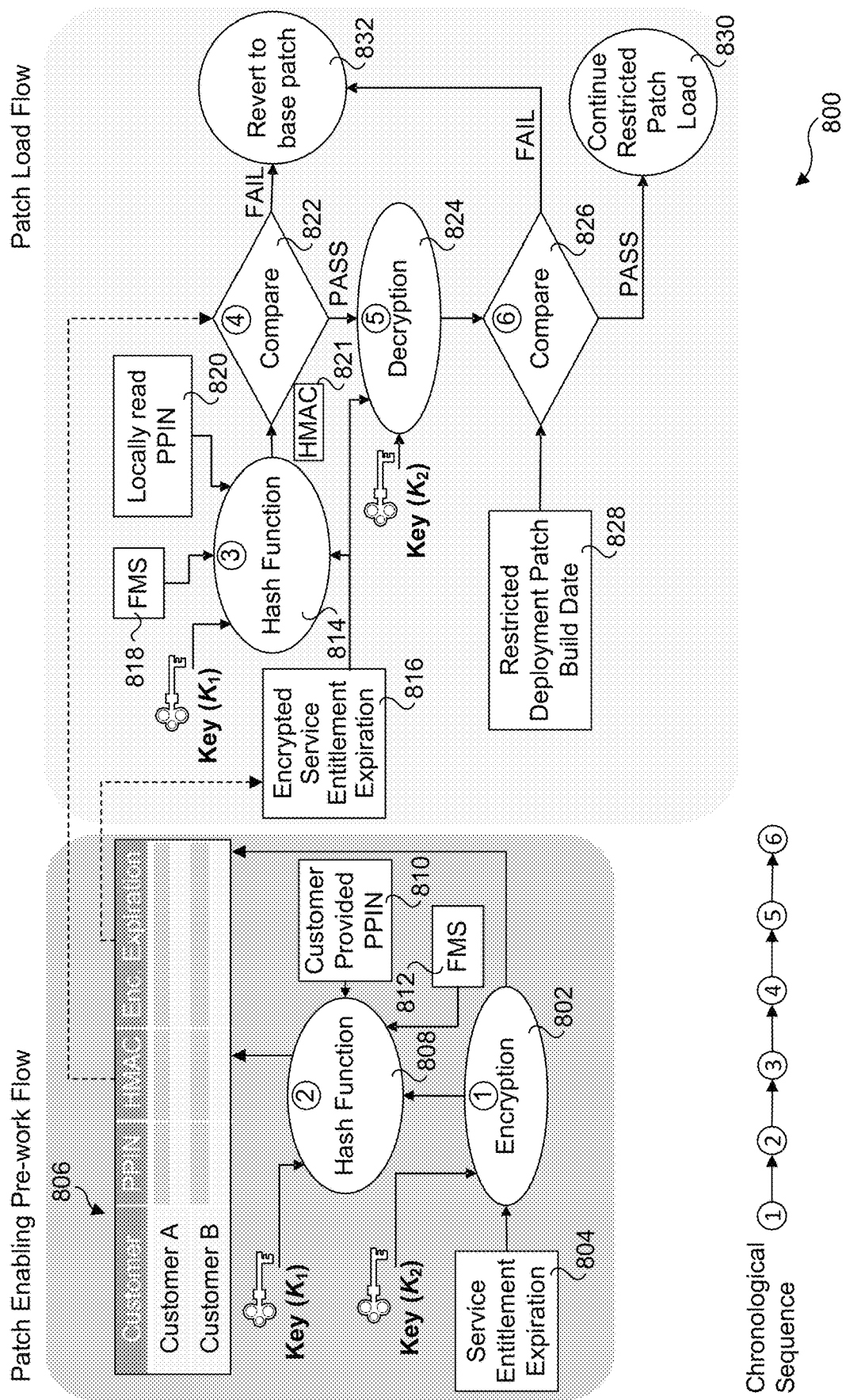
FIG. 8 is combination process and flow diagram schematically illustrating operations performed during a patch enabling pre-work flow and a subsequent patch load flow, according to one embodiment.

In one embodiment, the HMAC is calculated using the Processor PPIN and Encrypted Processor Targeted Deployment Expiry Date signed using a separate unique key also contained in Gn. The HMAC may also include Family Model Stepping (FMS) data, as described below. The uCode or OS runtime loader recomputes the HMAC with a locally read PPIN and the provided encrypted entitlement expiry date (optionally including the FMC data). The uCode or OS runtime loader then compares this recomputed HMAC with the provided HMAC to verify authenticity of the entitlement data by checking the signature against the signature generated with the public key embedded into the uCode. Further details of the comparison are shown in FIGS. 7 and 8 and described below.

In some instances, a given uCode release may including multiple uCode patches that are configured to be implemented on the same CPU model while supporting different stepping levels. For example, stepping levels for a CPU may including A0, A1, A2, etc. In the cases where changes are more significant, the stepping levels may use a next letter, such as B0, then B1, B2, etc. The uCode patches for a CPU model for a given stepping level may differ from uCode patches for that CPU model for another stepping level, thus multiple uCode patches may be included in a restricted deployment uCode update package.

Generally, an OEM/ODM (original equipment manufacturer or original device manufacturer) may create a restricted deployment uCode update package with multiple uCode patches to support multiple stepping levels for a CPU model or product (e.g., blade server, server module, etc.) for which the uCode update package is targeted. For example, a platform vendor may manufacture and sell a given blade server for several years employing the same CPU model, while during that time the stepping versions of the CPU model will have changed. For example, an original CPU in the server has been replaced, or different physical instances of the same blade server have CPUs with different stepping IDs. Thus, a uCode update for the same blade server model may require multiple patches.

In the case of a cloud operator, some uCode update packages may be more targeted to only be implemented on a CPU model with a specific stepping level. In this case, the restricted deployment uCode update package may only include a single uCode patch. In other cases, the cloud operator may generate uCode update packages with multiple uCode patches.

Figure 6:
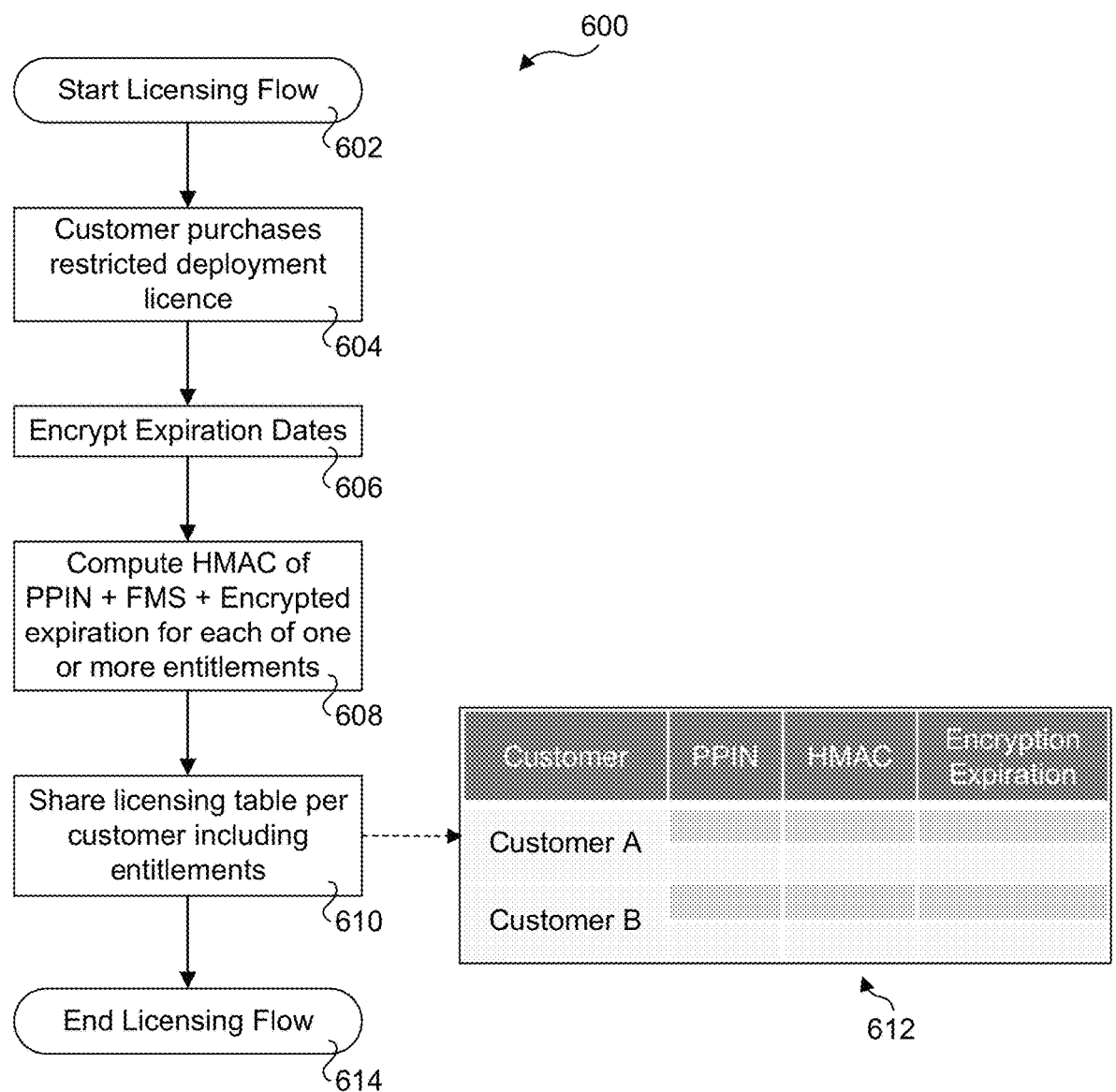
FIG. 6 is a flowchart illustrating a sequence of operations performed during licensing flow, according to one embodiment.

To support CPU models with different stepping levels, some embodiments further include FMS data, such as an identifier for a CPU having a particular stepping level, that is used to further authenticate and/or validate the restricted deployment uCode update release or patch. Such an approach is illustrated in FIG. 6 and described below.

Figure 3:
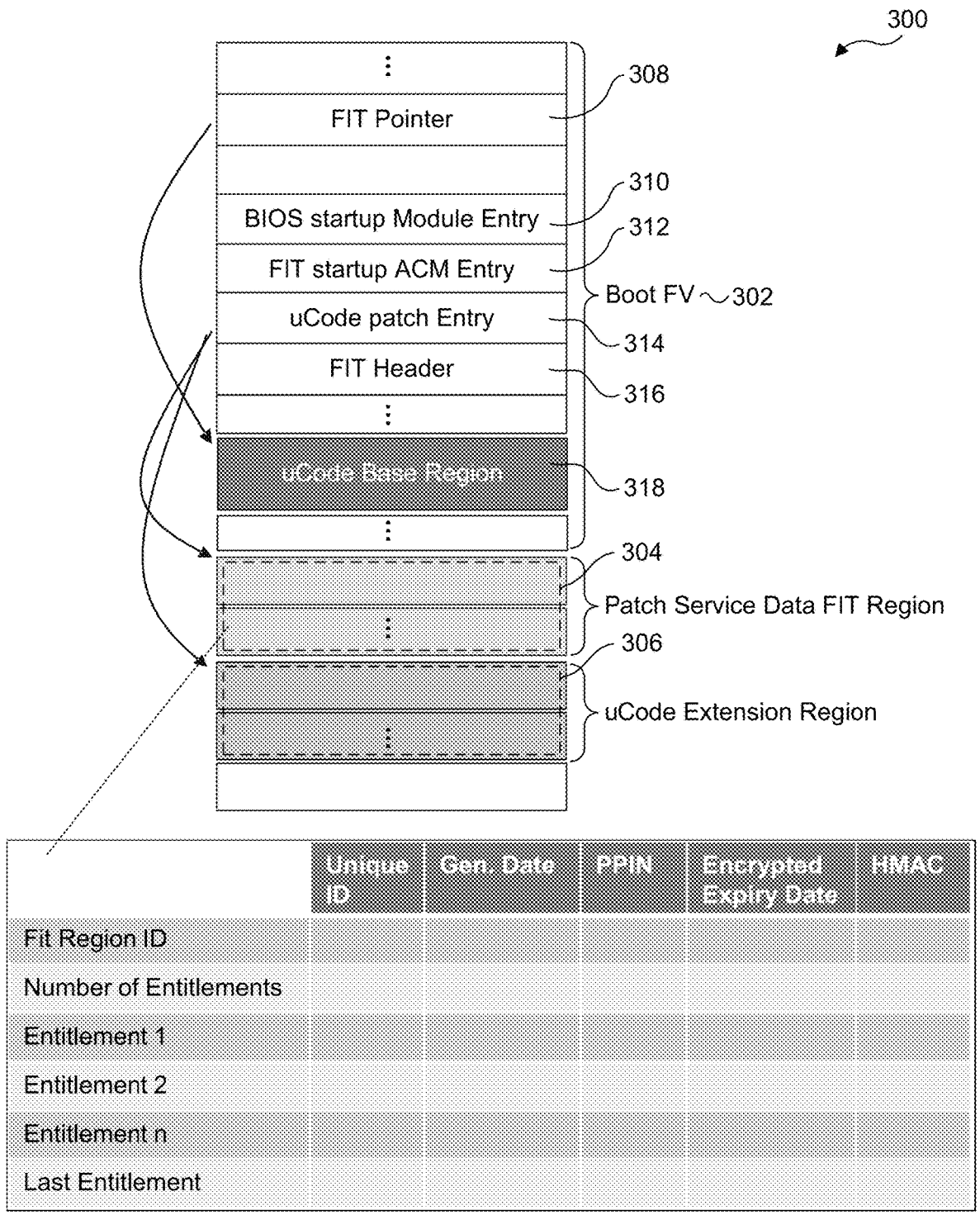
FIG. 3 is diagram illustrating the structure of a BIOS flash layout, according to one embodiment.

FIG. 3 shows a diagram 300 illustrating the structure of a BIOS flash layout, according to one embodiment. In one implementation, the BIOS region mapped to an address of 4G minus 16 MB is divided into a Boot Firmware Volume (FV) 302, a Patch Service Data FIT region 304, and one or more uCode extension regions 306. In some embodiments, the BIOS flash layout may include additional regions that are not separately shown in FIG. 3. Boot FV 302 contains a reset vector to (the starting address for) Firmware Interface Table (FIT) pointers 308, a BIOS startup module entry 310, a FIT startup ACM entry 312, a uCode patch Entry 314, a FIT header 316, and a uCode base image 318 (that corresponds to the latest bootable uCode image). In one embodiment, FIT pointer 308 is fixed and is not permitted to be changed via a runtime update. Patch Service Data FIT region 304 is used to store data corresponding to TABLE 1 above, as depicted in a license table 320. In one embodiment, uCode extension region 306 is used to store the runtime uCode patch(es).

FIT pointer 308 comprises an entry table with pointers (entry points) to various regions in the BIOS flash layout. In one embodiment, the location and size of uCode regions in BIOS flash are fixed, and thus the entry table for FIT pointer 308 will not be updated while updating contents of uCode regions. In one embodiment the platform BIOS comprises Unified Extensible Firmware Interface (UEFI) firmware have a structure in accordance with an UEFI standard.

Figure 4:
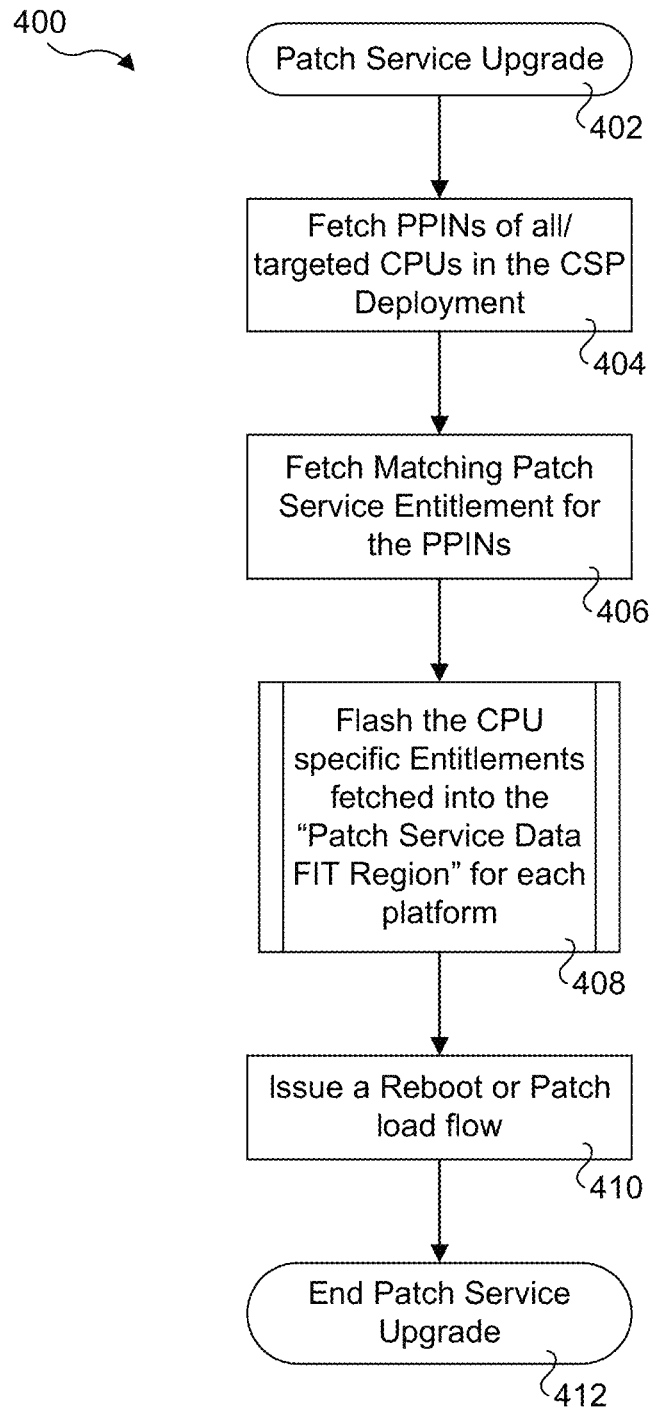
FIG. 4 is a flowchart illustrating a sequence of actions performed to provision one or more platforms with the entitlements for targeted deployment, according to one embodiment.

FIG. 4 shows a flowchart 400 illustrating the sequence of actions performed to provision one or more platforms with the entitlements for targeted deployment, according to one embodiment. In this non-limiting example, a Cloud Service Provider (CSP) customer uses CPU vendor provided service APIs to submit PPINs for all CPUs that need targeted deployment and downloads the generated entitlements for each CPU from the CPU vendor. The CSP customer then stores the entitlements in their data center management servers and pushes specific entitlements for each server for programming into the SPI Flash FIT region. Generally, a similar approach may be used for non-CSP implementations/environments.

Generally, the CPU vendor or customer may provide the tools to perform this programming. Once the Entitlements are provisioned, the BIOS may be updated with the Targeted deployment enabled patches integrated to allow the patch to load.

Referring to FIG. 4, the process begins in a start block 402. In a block 404 the PPINs of all CPUs (or a set of CPUs targeted for a specific patch) in the CSP deployment are fetched. In a block 406 matching Patch Service Entitlements for the PPINs obtained in block 404 are fetched. In a block 408, the CPU specific Entitlements that are fetched are flashed (i.e., written to Flash memory) into the Patch Service Data FIT region for each platform. In a block 410 a reboot or patch load flow is issued. As described below, it is preferably to have the patch installed during OS runtime such that the platform (and its services) does not have to be brought done to install the patch. The process then exits in an end block 412.

Figure 5:
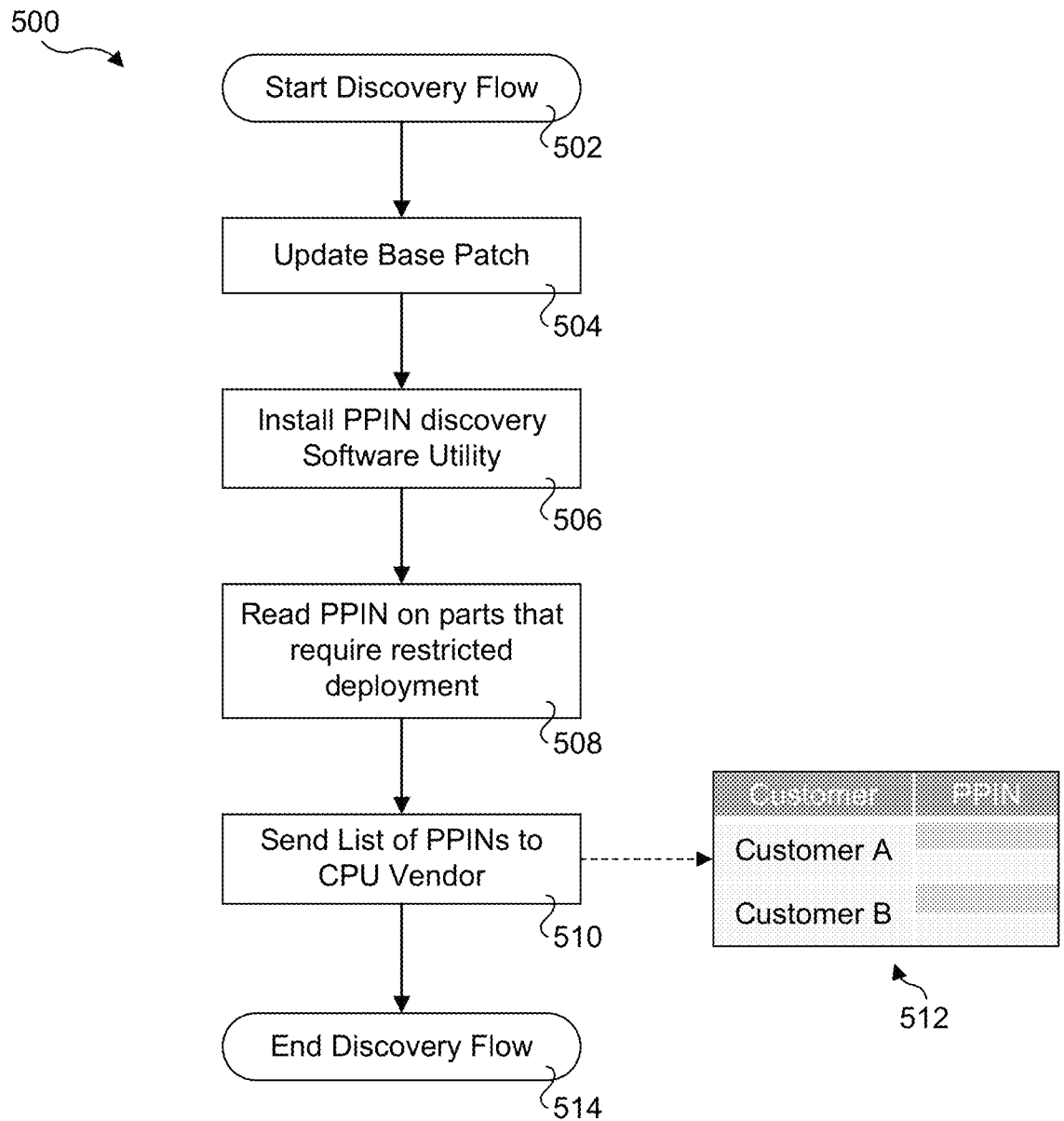
FIG. 5 is a flowchart illustrating a sequence of operations performed during discovery flow, according to one embodiment.

FIG. 5 shows a flowchart 500 illustrating the sequence of operations performed during discovery flow, according to one embodiment. The process begins in a start block 502, followed by block 504 in which a base patch is updated. Generally, this operation may be performed by the CPU vendor or by the CPU vendor in combination with the customer. To update the base patch, a read-only MSR is provided to report the PPIN if a PPIN MSR does not already exist. A new MSR is also provided to request restricted deployment entitlement verification.

In a block 506, the PPIN discovery software utility is installed. In a block 508 the PPIN on the parts that require restricted deployment are read. The list of PPINs is sent to the CPU vendor in a block 510, as represented by a table 512. This completes the discovery flow, as depicted by an end block 514.

FIG. 6 shows a flowchart 600 illustrating a sequence of operations performed during licensing flow, according to one embodiment. During a first operation in a block 604 following a start block 602, the customer purchases a restricted deployment license. Generally, the purchase/license may be monetized over a fix period, such as pro-rated on an annual basis. The CPU vendor tracks per-customer support expiration dates associated with customer licenses. In a block 606, the expiration dates are encrypted. As shown in FIG. 7 and described below, in one embodiment the expiration dates are encrypted with a secret key that may be contained in a base patch or contained in a restricted deployment uCode patch. Generally, encryption is optional, but recommended for resell scenarios.

In a block 608 an HMAC of a concatenation of the PPIN+FMS data (e.g., an FMS identified or similar indicia)+Encrypted expiration is computed for each of one or more service entitlements. Alternatively, the FMS data may be left out of the HMAC computation. The HMAC computation uses a secret key separate from the key used for encrypting the expiration dates in block 606. The HMAC key is also contained in the base patch or restricted deployment uCode patch. In a block 610 a licensing table 612 containing one or more per customer service entitlements is shared with an end user, such as a CSP. This completes the licensing flow, as depicted by an end block 614.

FIG. 7 shows a flowchart 700 illustrating operations and logic performed during an in-field update flow, according to one embodiment. The first set of operations depicted in the left-hand column are performed by a customer. Following a start block 702, in a block 704 a license table 706 is installed in the patch loader accessible region of the OS. Generally, license table contains one or more entries including PPINs, HMACs and Encrypted expiration dates comprising service entitlement license information that will be used to provision service entitlement license information on the target platforms. The patch loader is expected to be a custom runtime OS patch loader; while the patch loader could be implemented in BIOS, a BIOS patch load would mandate a reboot, which is highly undesirable in cloud deployments.

In a block 708 the PPIN is read and is used to lookup the HMAC and encrypted expiration date from license table 706. In a block 710, a request is made to for enablement of the restricted deployment patch load with the HMAC and expiration date. In one embodiment this uses the new MSR mechanism build into the base patch. This operation provides a restricted deployment patch offset, HMAC, and encrypted expiration date.

The remaining operations are performed by each platform targeted for a restricted deployment uCode update. In a block 712 a Write MSR instruction (WRMSR) flow is used to read the PPIN of the current part locally. In a block 714 the WRMSR flow recomputes the HMAC of the local PPIN with the provided expiration. In decision block 716 a determination is made to whether the provided HMAC and the (re)computed HMAC values match. If they match, the result of decision block 716 is a PASS, and the logic proceeds to a block 718 in which the restricted deployment encryption date provided in the patch is decrypted. In a decision block 720, a comparison is made between the patch build date and the decrypted expiration date. Each restricted deployment patch contains a build time stamp used for the comparison. If the decrypted expiration date is later than the build time stamp, the result of decision block 720 is a PASS, and the logic proceeds to a block 722 in which the ALLOW RD (allow read) bit is set to allow restricted deployment patch load. The restricted deployment patch is then loaded by the OS patch loader, which checks the ALLOW RD bit to verify the restricted deployment patch is OK to load. As shown by an end block 728, this completes the in-field update flow.

Returning to decision block 716, if the provided and recomputed HMACs do not match, the result of decision block 716 is a FAIL and the logic proceeds to a block 726 in which the ALLOW RD bit is not set (i.e., is cleared or remains cleared). This results in no impact to the previously loaded base patch. Similarly, if the ES patch build date is later than the decrypted expiration date, the result of decision block 720 is also a FAIL, with the logic proceeding to block 726. Following block 726, the process exits at end block 728.

FIG. 8 shows a combination process and flow diagram 800 schematically illustrating operations performed during a patch enabling pre-work flow that would proceed a subsequent patch load flow. The sequence of operations is depicted by encircled numbers 1-6. During a first operation '1', a secret key $K_2$ is used by an encryption operation 802 to encrypt service entitlement expiration 804, with the output of encryption operation 802 copied into the encrypted expiration date field of a license table 806. During a second operation '2', a hash operation 808 is performed on a concatenation of the customer provided PPIN 810, an FMS 812, and the encrypted expiration date output from encryption operation 802 using a secret key $K_1$ to compute an HMAC, which is added to table 806 in the same row as the PPIN and encrypted expiration date. License table 806 is then provided to the target platforms to provision the target platforms with service entitlement license information contained in the license table.

The remaining operation and logic are implemented during the patch load flow by a computing platform targeted for the restricted deployment uCode update. Generally, a restricted deployment uCode update may include secret key $K_1$ and $K_2$ or one or both secret keys may be provided in a previously installed base patch or may be built into the silicon. During a third operation '3', key $K_1$ is used by a hash function 814 to compute an HMAC 821 using a concatenation of the encrypted service entitlement expiration date 816 read from license table 806, a locally read FMS 818 for the CPU on the computing platform and a locally read PPIN 820. As depicted by a decision block 822, during a fourth operation '4' the HMAC associated with the applicable PPIN is read from license table 806 and is compared with recomputed HMAC 821 to detect if there is a match. If the HMACs match, the result of decision block 822 is a PASS and the logic proceeds to perform a decryption operation 824 of the encrypted service entitlement expiration date 816 using secret key $K_2$ during a fifth operation '5'.

During a sixth operation '6' depicted in a decision block 826, a comparison is made between the restricted deployment patch build date 828 time-stamped in the base patch and the decrypted service entitlement expiration date output by decryption operation 826. This comparison is similar to that made in decision block 720 of FIG. 7. If the build date is before the entitlement expiration date, the result of decision block 826 is a PASS and the logic proceeds to continue the restricted patch load, as shown in a block 8830. If the build date is later than the entitlement expiration date, the comparison result of decision block 826 is a FAIL, and the logic proceeds to revert to the base patch, as depicted in a block 832. Similarly, if the HMACs do not match in decision block 822, the result is a FAIL and the logic proceeds to block 832.

Figure 9:
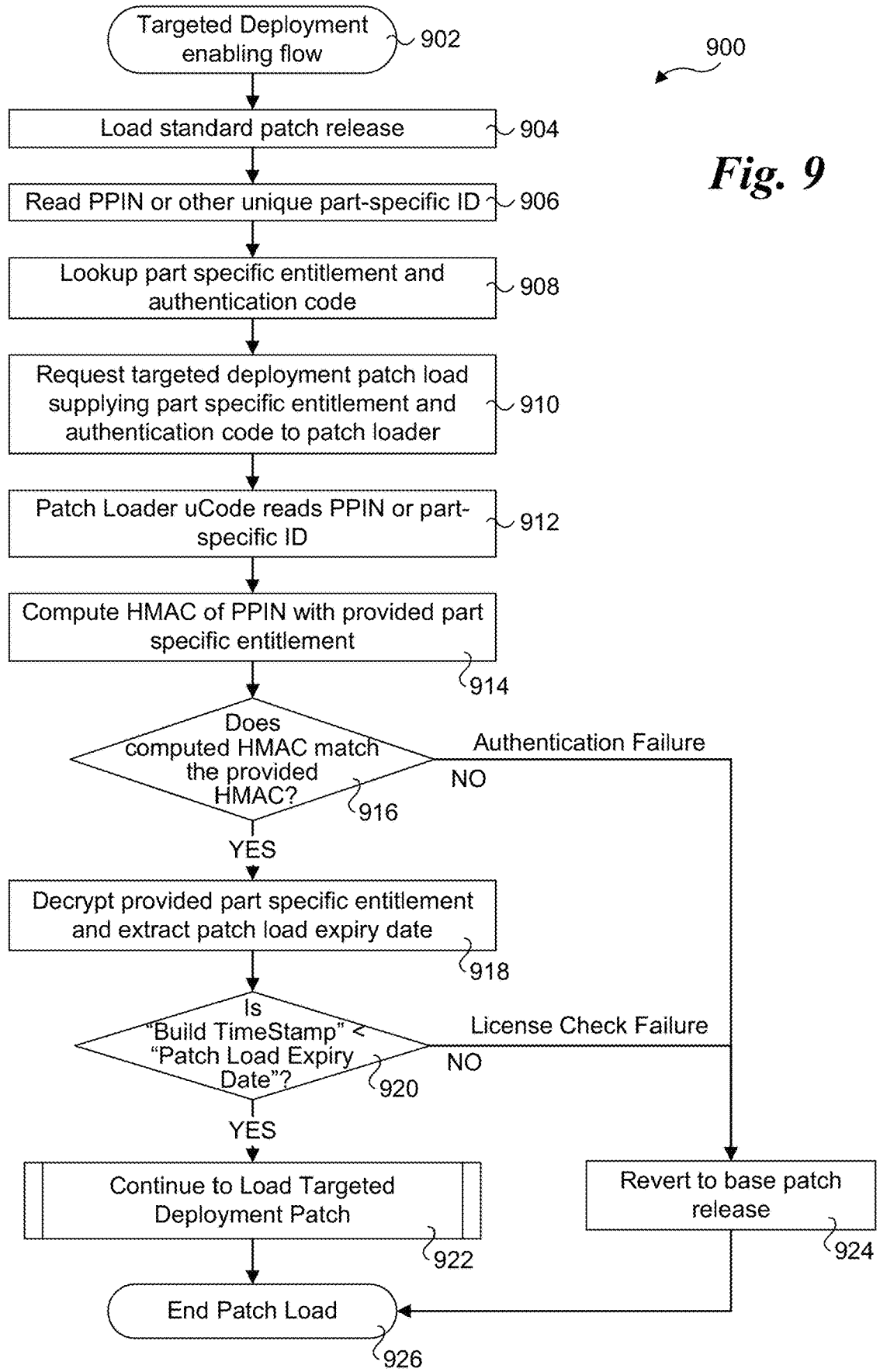
FIG. 9 is a flowchart illustrating operations and logic used to authenticate and load the targeted deployment enabled patch on a CPU using a Runtime or Patch Load time provisioning method, according to one embodiment.

FIG. 9 shows a flowchart 900 illustrating operations and logic used to authenticate and load the targeted deployment enabled patch on a CPU using a Runtime or Patch Load time provisioning method, according to one embodiment. The process begins in a start block 902, followed by block 904 in which the base patch release is loaded. In a block 906 the PPIN or other part-specific ID is read, and used as a lookup to identify a part specific entitlement and authentication code, as shown in a block 908.

In a block 910, the targeted deployment patch load is requested to supply the part specific entitlement and authentication code to the patch loader. The patch loader reads the PPIN or part-specific ID in a block 912.

In a block 914 the HMAC of the PPIN is computed with the provided part specific entitlement. In a decision block 916 a determination is made to whether the computed HMAC matches the provided HMAC. If the answer is NO (no HMAC match), authentication has failed and the logic proceeds to a block 924 in which the patch reverts to the base patch release. The patch load process is then completed in an end block 926. If the HMACs match, the answer to decision block 916 is YES and the logic proceeds to a block 918 in which the provided part specific entitlement is decrypted and the patch load expiry date is extracted. In a decision block 920 a comparison is made to determine whether the build timestamp is later than the patch load expire date. If the answer is NO, the license check fails, and the logic proceeds block 924. If the answer to decision block 920 is YES, the logic proceeds to a block 922 in which loading of the targeted deployment patch continues. After the process in block 922 completes, the logic proceeds to end block 926.

Figure 10:
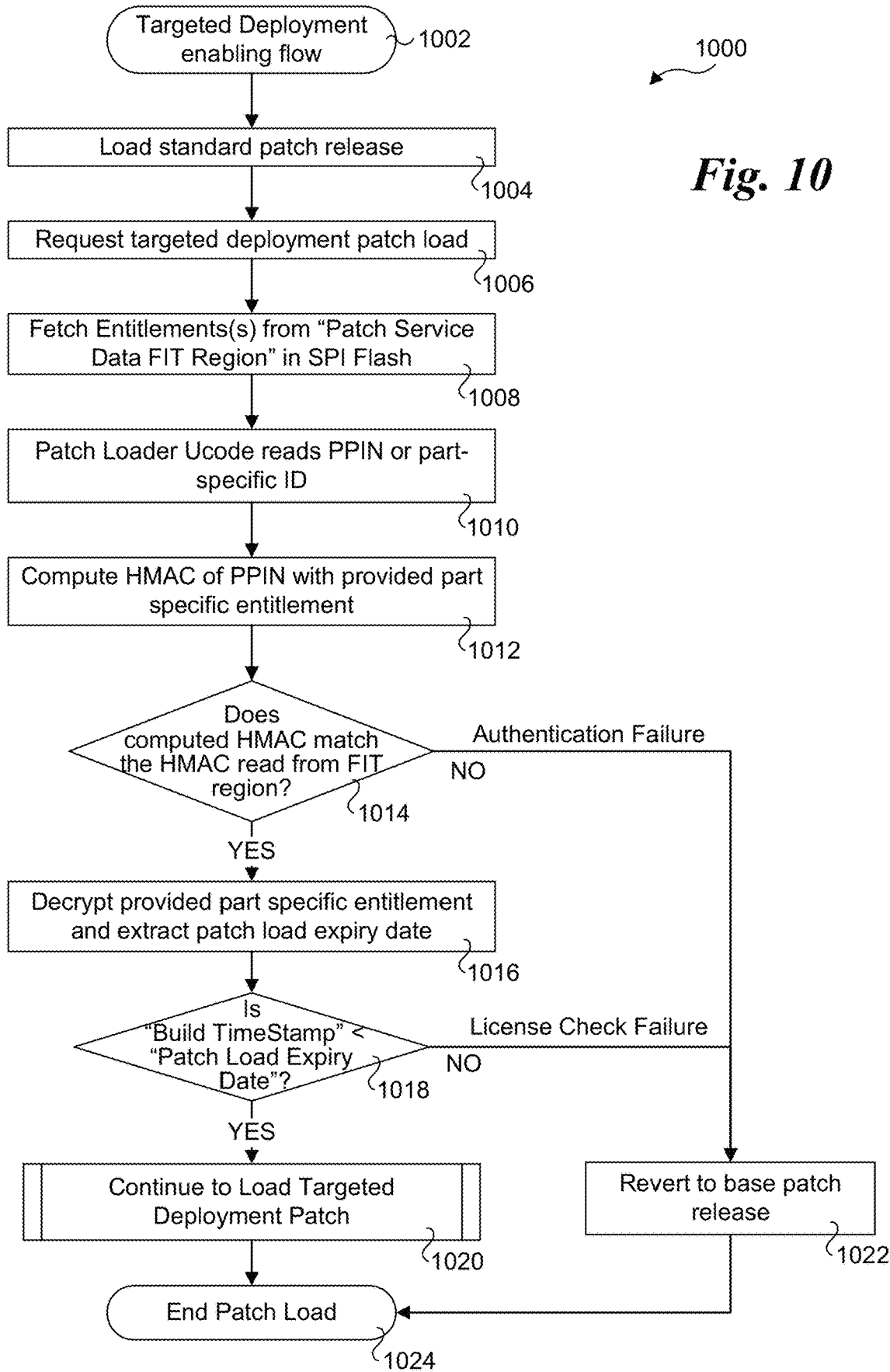
FIG. 10 is a flowchart illustrating operations and logic used to authenticate and load the targeted deployment enabled patch on a CPU for a Flash-based provisioning and patch load flow, according to one embodiment.

FIG. 10 shows a flowchart 1000 illustrating operations and logic used to authenticate and load the targeted deployment enabled patch on a CPU for a Flash-based provisioning and patch load flow. Following start block 1002, the base patch release is loaded in a block 1004. In a block 1006, the targeted deployment patch load is requested. In a block 1008 one or more entitlements are fetched from the "Patch Service Data FIT Region" in SPI Flash. The patch loader reads the PPIN or part-specific ID in a block 1010.

In a block 1012 the HMAC of the PPIN is computed with the provided part specific entitlement. In a decision block 1014 a determination is made to whether the computed HMAC matches the HMAC read from the FIT region. If the answer is NO (no HMAC match), authentication has failed and the logic proceeds to a block 1022 in which the patch reverts to the base patch release. The patch load process is then completed in an end block 1024. If the HMACs match, the answer to decision block 1014 is YES and the logic proceeds to a block 1016 in which the provided part specific entitlement is decrypted and the patch load expiry date is extracted. In a decision block 1018 a comparison is made to determine whether the build timestamp is later than the patch load expire date. If the answer is NO, the license check fails, and the logic proceeds block 1022. If the answer to decision block 1018 is YES, the logic proceeds to a block 1020 in which loading of the targeted deployment patch continues. After the process in block 1020 completes, the logic proceeds to end block 1024.

Figure 11:
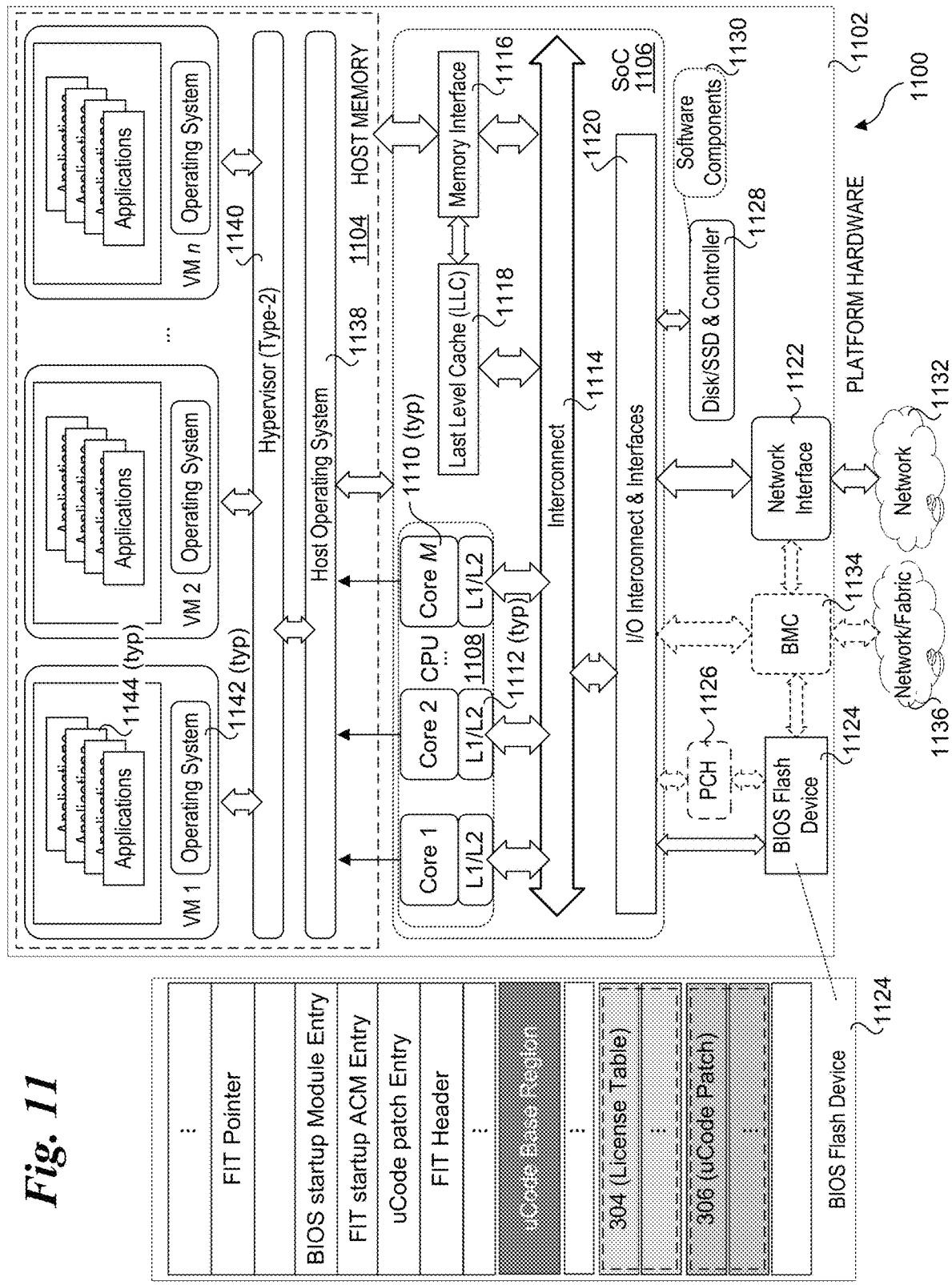
FIG. 11 is a schematic diagram of a platform architecture corresponding to a computing platform suitable for implementing aspects of the embodiments described herein.

FIG. 11 shows an embodiment of a platform architecture 1100 corresponding to a computing platform suitable for implementing aspects of the embodiments described herein. Architecture 1100 includes a hardware layer in the lower portion of the diagram including platform hardware 1102, and a software layer that includes software components running in host memory 1104. Architecture 1100 is configured to implement embodiments of the restricted deployment uCode update solutions described above, as illustrated by the BIOS flash layout depicted for BIOS flash device 1124 corresponding to the BIOS flash layout of diagram 300 in FIG. 3.

Platform hardware 1102 includes a processor 1106 having a System on a Chip (SoC) architecture including a central processing unit (CPU) 1108 with M processor cores 1110, each coupled to a Level 1 and Level 2 (L1/L2) cache 1112. Each of the processor cores and L1/L2 caches are connected to an interconnect 1114 to which each of a memory interface 1116 and a Last Level Cache (LLC) 1118 is coupled, forming a coherent memory domain. Memory interface is used to access host memory 1104 in which various software components are loaded and run via execution of associated software instructions on processor cores 1110.

Processor 1106 further includes an Input/Output (I/O) interconnect hierarchy, which includes one or more levels of interconnect circuitry and interfaces that are collectively depicted as I/O interconnect & interfaces 1120 for simplicity. Various components and peripheral devices are coupled to processor 1106 via respective interfaces (not all separately shown), including a network interface 1122, a BIOS flash device 1124 in which BIOS uCode is stored having a BIOS flash layout illustrated in diagram 300 and discussed above. As an option, BIOS flash device 1124 may be operatively coupled to processor 1106 via a platform controller hub (PCH) 1126. Platform hardware 1102 also includes a disk drive or solid state disk (SSD) with controller 1128 in which software components 1130 are stored. Optionally, all or a portion of the software components used to implement the software aspects of embodiments herein may be loaded over a network 1132 accessed by network interface 1122.

In some embodiments, platform hardware 1102 includes an optional baseboard management controller (BMC) 1134. The BMC may include a separate communications interface to a network or fabric 1136 and/or may employ network interface 1122 for communications. In some embodiments, network or fabric 1136 comprises a management network or fabric such as used in a data center or the like that is separate from network 1132.

During platform initialization, a current or new uCode image and various UEFI modules (not separately shown) are loaded into host memory 1104 and booted, followed by loading and initialization of various software components. The software components include a host operating system 1138 and a Type-2 hypervisor 1140 used to host n virtual machines (VMs) VM 1, VM 2 . . . VM n, each including an operating system 1142 on which one or more applications 1144 are run. Platform architectures employing containers, such as Docker®-type containers, may be implemented in a similar manner. The computing platform may also employ a Type-1 "bare metal" hypervisor rather than Type-2 hypervisor 1140. In addition, non-virtualized computing platforms that only run a single instance of an operating system may also be used.

In some embodiments uCode patches may be received "out of band" via BMC 1134 over network or fabric 1136, with BMC writing the uCode patch into uCode extension region 306 of BIOS flash device 1124 independent of software running on CPU 1108. The BMC may then notify operating system 1138 of the new uCode patch, which will trigger the OS patch loader to begin execution. The OS patch loader will then load the uCode patch into processor cores 1110 to update the uCode for CPU 1108. Optionally, upon receipt of the uCode patch the BMC may notify operating system 1138, which will launch the OS patch loader to write the uCode patch into BIOS flash device 1124 and load the uCode patch into processor cores 1110. Under other embodiments, a uCode patch may be provided "in-band" via network 1132 and network interface 1122. In this case, software running on CPU 1108 will coordinate the delivery of the uCode patch via network interface 1122 and will launch the OS patch loader.

The techniques for restricted deployment of targeted processor firmware updates disclosed herein provide several advantages. For the CPU vendor, advantages include the ability to control how a patch is deployed at the granularity of specific parts where previously the lowest granularity was by CPUID (i.e. product generation/family). It also provides a monetization potential for the CPU vendor for future patch releases as a service beyond the "Shelf Life" of a CPU. The advantages for the CPU vendor further include the ability to restrict the timeframe for which a patch providing special functionality may be used on targeted systems. The techniques also provide added value to customers. For example, a customer may have an installed base of the target processors but only a portion of those processors may need specific functions/fixes. The techniques enable CPU venders to accommodate the customer requirement of partial/targeted support to be benefit of the customer.

In addition to applying uCode patches to CPUs, the teaching and principles disclosed herein may be applied to Other Processing Units (collectively termed XPUs) including one or more of Graphic Processor Units (GPUs) or General Purpose GPUs (GP-GPUs), Tensor Processing Unit (TPU) Data Processor Units (DPUs), Artificial Intelligence (AI) processors or AI inference units and/or other accelerators, FPGAs and/or other programmable logic (used for compute purposes), etc. While some of the diagrams herein show the use of CPUs, this is merely exemplary and non-limiting. Generally, any type of XPU may be used in place of a CPU in the illustrated embodiments. Moreover, as used in the following claims, CPUs and all forms of XPUs comprise processing units.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as such as 'n', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for restricted deployment of microcode (uCode) for a processing unit having a part identifier on a platform including firmware stored in a firmware storage device, comprising:
    provisioning the platform with service entitlement license information;
    storing the service entitlement license information in the firmware storage device;
    receiving a restricted deployment uCode update release at the platform;
    authenticating and verifying the restricted deployment uCode update release against service entitlement license information stored on the platform;
    when the restricted deployment uCode update release is determined to be authentic and verified, updating uCode on the processing unit using uCode in the restricted deployment uCode update release,
    wherein the firmware comprises Unified Extensible Firmware Interface (UEFI) firmware and the service entitlement license information is stored in a Firmware Interface Table region of the firmware storage device.

2. The method of claim 1, further comprising:
    computing a first hash using a first key over data comprising the part identifier plus additional data;
    generating a license table containing service entitlement license information including the first hash and at least one license attribute associated with the service entitlement license information; and
    storing the license table on the platform to provision the platform with the service entitlement license information.

3. The method of claim 2, further comprising:
    at the platform,
        computing a second hash using a second key matching the first key over data comprising a locally read part identifier for the processing unit of the platform and additional data including at least a portion of data contained in the license table;
        extracting the first hash from the license table;
        comparing the first hash and second hash to determine if they match; and
        employing a result of the match comparison to determine, at least in part, whether to update uCode on the processing unit using uCode in the restricted deployment uCode update release.

4. The method of claim 3, wherein the additional data includes processing unit family model stepping data.

5. The method of claim 1, wherein the service entitlement license information comprises a respective expiration date for one or more service entitlements and wherein the restricted deployment uCode update release includes a build date, further comprising:
    at the platform,
        extracting the build date from the restricted deployment uCode update release;
        extracting the expiration date for the service entitlement from the service entitlement license information provisioned for the platform;
        comparing the build date to the expiration date for the service entitlement; and
        when the build date is prior to the expiration date for the service entitlement, updating uCode on the processing unit using uCode in the restricted deployment uCode update release.

6. The method of claim 1, wherein the part identifier comprises a Protected Processor Inventory Number (PPIN) that is stored in a register on the processing unit.

7. The method of claim 1, further comprising providing, in the restricted deployment uCode update release or separately, at least one of firmware and software to be executed on the processing unit of the platform to perform authentication and verification of the restricted deployment uCode release against the service entitlement license information.

8. A computing platform, comprising:
    a processing unit having a part identifier and containing microcode (uCode);
    at least one memory, coupled to the processing unit, in which software instructions are stored;
    at least one communication interface, operatively coupled to the processing unit; and
    a firmware storage device, operatively coupled to the processing unit, in which firmware instructions are stored,
    wherein execution of at least one of the software instructions and firmware instructions on the processing unit enable the computing platform to:
        receive and store service entitlement license information wherein the service entitlement license information includes one or more service entitlements, each service entitlement including,
            an original hash computed using a first key over data comprising a part
            identifier for a processing unit plus additional data; and
            at least one license attribute, authenticate and verify a restricted deployment uCode update release received by the computing platform against the service entitlement license information by,
  reading, from the processing unit, a part identifier for the processing unit;
  using the part identifier that is read to identify an associated service entitlement;
  computing a recomputed hash using a second key matching the first key over data comprising the read part identifier for the processing unit and additional data contained in the associated service entitlement;
  extracting the original hash from the associated service entitlement; and
  comparing the original hash and the recomputed hash to determine if they match;
employ a result of the match comparison to determine, at least in part, whether to update uCode on the processing unit using uCode in the restricted deployment uCode update release; and
when the restricted deployment uCode update release is determined to be authentic and verified, update uCode in the processing unit using uCode in the restricted deployment uCode update release.

9. The computing platform of claim 8, wherein the additional data includes processing unit family model stepping data.

10. The computing platform of claim 8, wherein the service entitlement license information comprises a respective expiration date for each service entitlement, and wherein execution of at least one of the firmware and software on the processing unit further enables the computing platform to:
  extract a build date from the restricted deployment uCode update release;
  extract the expiration date for the associated service entitlement;
  compare the build date to the expiration date for the associated service entitlement; and
  when the build date is prior to the expiration date for the associated service entitlement and the original and recomputed hashes match, update uCode on the processing unit using uCode in the restricted deployment uCode update release.

11. The computing platform of claim 10, wherein the firmware storage device stores a base patch release that is loaded when the platform is booted, and wherein, when at least one of:
  the original hash and recomputed hash do not match; and
  the build date is later than the expiration date for the associated service entitlement, the uCode for the processing unit is reverted to the base patch release.

12. A non-transitory machine-readable medium having instructions stored thereon configured to be executed by a processing unit of a computing platform including a firmware storage device to enable the processing unit to:
  access service entitlement license information stored on the computing platform, wherein the service entitlement license information includes one or more service entitlements, each service entitlement including,
    an original hash computed using a first key over data comprising a part identifier for a processing unit plus additional data; and
    at least one license attribute, employ the service entitlement license information to authenticate and verify a restricted deployment uCode update release by,
    computing a recomputed hash using a second key matching the first key over data comprising the read part identifier for the processing unit and additional data contained in the associated service entitlement;
    extracting the original hash from the associated service entitlement; and
    comparing the original hash and the recomputed hash to determine if they match;
  employing a result of the match comparison to determine, at least in part, whether to load uCode in the restricted deployment uCode update release into the processing unit; and
  when the restricted deployment uCode update release is determined to be authentic and verified, load uCode into the processing unit using uCode in the restricted deployment uCode update release.

13. The non-transitory machine-readable medium of claim 12, wherein the additional data includes processing unit family model stepping data.

14. The non-transitory machine-readable medium of claim 12, wherein the service entitlement license information comprises a respective expiration date for each service entitlement, and wherein execution of the instructions on the processing unit further enables the computing platform to:
  extract a build date from the restricted deployment uCode update release;
  extract the expiration date for the associated service entitlement;
  compare the build date to the expiration date for the associated service entitlement; and
  when the build date is prior to the expiration date for the associated service entitlement and the original and recomputed hashes match, load uCode in the restricted deployment uCode update release into the processing unit.

15. The non-transitory machine-readable medium 14, wherein the firmware storage device stores a base patch release that is loaded when the platform is booted, and wherein, when at least one of:
  the original hash and recomputed hash do not match; and
  the build date is later than the expiration date for the associated service entitlement, the uCode for the processing unit is reverted to the base patch release.

* * * * *